E. S. ROBERTS.
COTTON BALE TIE.

No. 75,461.     Patented Mar. 10, 1868.

WITNESSES:
W. C. Ashkettle
A. L. Roberts

INVENTOR:
E. S. Roberts
per Munn & Co.
Attorneys

United States Patent Office.

E. S. ROBERTS, OF COLUMBUS, GEORGIA.

*Letters Patent No. 75,461, dated March 10, 1868.*

IMPROVED COTTON-BALE TIE.

The Schedule referred to in these Letters Patent and making part of the same.

TO ALL WHOM IT MAY CONCERN:

Be it known that I, E. S. ROBERTS, of Columbus, in the county of Muscogee, and State of Georgia, have invented a new and improved Cotton-Bale Tie or Hoop-Lock; and I do hereby declare that the following is a full, clear, and exact description thereof, which will enable those skilled in the art to make and use the same, reference being had to the accompanying drawings, forming part of this specification.

This invention consists of a metallic box, of quadrilateral form, having an open outer side to receive the ends of the hoop, which are bent, so as to form loops through which, and the sides of the box, metal pins pass, and firmly connect the ends of the hoop together, the box, under the expansion of the bale when relieved of pressure, sinking into the bale, so that the ends of the hoop which are secured in the box will not project out beyond the side of the bale. In the accompanying sheet of drawings—

Figure 1:
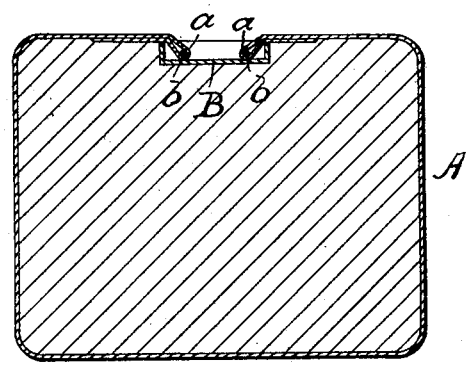
Figure 2:
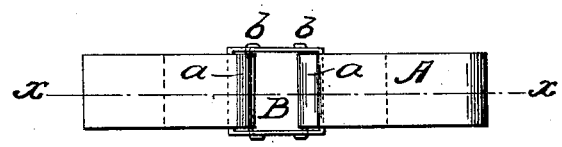

Figure 1 is a section of my invention shown on a bale, $x$ $x$, fig. 2, indicating the line of section.

Figure 2, an outer or front view of the same.

Similar letters of reference indicate corresponding parts.

A represents a metallic bale-hoop, the ends of which are bent to form loops $a$ $a$. B is a cast or wrought-iron metallic box, of quadrilateral form, about square, but quite shallow, the box being open at its outer side, and sufficiently wide to receive the ends of the hoop. The sides of this box have holes drilled, to allow pins or rods $b$ $b$ to pass through, said pins or rods also passing through the loops $a$ $a$ at the ends of the hoop, and securing said ends in the box B.

The ends of the pins or rods $b$ $b$ are bent down in order to prevent them from drawing or slipping casually out from the box.

The ends of the hoop are secured in the box B when the bale is under compression, and when the bale is relieved of pressure its expansion causes the box B to sink into its side, as shown in fig. 1; and the ends of the hoop, therefore, are not allowed to project out from the bale, but are kept entirely within the box B, and hence are out of the way, and cannot serve as an encumbrance or an inconvenience in withdrawing the bale from the press, or in moving it about from place to place; nor can the ends of the bands slip—a contingency of frequent occurrence with most of the metallic ties in use.

I claim as new, and desire to secure by Letters Patent—

The cotton-bale tie, constructed as described, and consisting of the open box B, provided near each end with a transverse removable pin, $b$, around which the hoop A passes, the extremities of said hoop, after passing around the pins, being bent back between the bale and the hoop, in which position they are held by the outward pressure of the bale, all arranged as described, for the purpose specified.

E. S. ROBERTS.

Witnesses:
J. W. PLEASANTS,
W. FLEMING.